United States Patent
Nielsen et al.

(10) Patent No.: US 10,445,946 B2
(45) Date of Patent: Oct. 15, 2019

(54) DYNAMIC WORKPLANE 3D RENDERING ENVIRONMENT

(71) Applicant: Microsoft Technology Licensing, LLC, Redmond, WA (US)

(72) Inventors: Soren Hannibal Nielsen, Kirkland, WA (US); Kim McAuliffe, Seattle, WA (US); Patrick O'Leary, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 150 days.

(21) Appl. No.: 14/066,397

(22) Filed: Oct. 29, 2013

(65) Prior Publication Data

US 2015/0116327 A1  Apr. 30, 2015

(51) Int. Cl.
*G06F 3/048* (2013.01)
*G06T 15/20* (2011.01)
(Continued)

(52) U.S. Cl.
CPC .............. *G06T 19/20* (2013.01); *G06F 3/048* (2013.01); *G06F 3/0482* (2013.01);
(Continued)

(58) Field of Classification Search
CPC ............. A63F 13/63; G06T 2219/2004; G06T 2200/24; G06T 3/048; G06T 2219/008; G06T 15/20; G06F 2203/04801; G06F 3/04815; G06F 2203/04802; G06F 3/0484–3/0486
See application file for complete search history.

(56) References Cited

U.S. PATENT DOCUMENTS 6,650,339 B1 * 11/2003 Silva .................... G06F 3/0481
345/619
6,771,276 B1 * 8/2004 Highsmith ............. G06T 15/20
345/419
(Continued)

FOREIGN PATENT DOCUMENTS

CN    102763422 A    10/2012
WO    03023720 A1    3/2003

OTHER PUBLICATIONS

Stein, Terii, and Sabine Coquillart. "The metric cursor." Computer Graphics and Applications, 2000. Proceedings. The Eighth Pacific Conference on. IEEE, 2000.*
(Continued)

*Primary Examiner* — Daniel F Hajnik
(74) *Attorney, Agent, or Firm* — Alleman Hall Creasman & Tuttle LLP

(57) ABSTRACT

Rendering of a dynamic workplane in a 3D rendering environment accessed through a two dimensional user interface is provided. The dynamic workplane is associated to a rendering tool in a rendering application for the 3D environment. The dynamic workplane orientation and position are dependent on the view perspective, the rendering tool selected and an interaction location in the 3D environment. The location and orientation of the dynamic workplane can change with each interaction by the user, each tool selected, and with changes in perspective relative to the 3D environment.

18 Claims, 15 Drawing Sheets

(51) Int. Cl.
*G06T 19/20* (2011.01)
*G06F 3/0481* (2013.01)
*G06F 3/0488* (2013.01)
*G06F 3/0482* (2013.01)

(52) U.S. Cl.
CPC ........ *G06F 3/0488* (2013.01); *G06F 3/04815* (2013.01); *G06F 3/04817* (2013.01); *G06T 15/20* (2013.01); *G06T 2200/24* (2013.01); *G06T 2210/21* (2013.01); *G06T 2219/008* (2013.01); *G06T 2219/2021* (2013.01)

(56) References Cited

U.S. PATENT DOCUMENTS

| | | | |
|---|---|---|---|
| 7,830,377 | B1 | 11/2010 | Desimone et al. |
| 2003/0117392 | A1 | 6/2003 | Harvill |
| 2005/0046645 | A1* | 3/2005 | Breton ............... G06T 15/20 345/660 |
| 2005/0243085 | A1 | 11/2005 | Schechter et al. |
| 2006/0212150 | A1 | 9/2006 | Sims, Jr. |
| 2007/0080960 | A1 | 4/2007 | Dayanand et al. |
| 2009/0135185 | A1* | 5/2009 | Demizu ............... G06T 19/00 345/427 |
| 2012/0050281 | A1 | 3/2012 | Tanaka et al. |
| 2013/0222385 | A1 | 8/2013 | Dorsey et al. |
| 2013/0243306 | A1* | 9/2013 | Falco, Jr. ............ G06T 7/0042 382/154 |
| 2014/0229871 | A1* | 8/2014 | Tai .................... G06F 3/04883 715/765 |
| 2014/0245216 | A1* | 8/2014 | Saito ................. G06F 3/04842 715/781 |

OTHER PUBLICATIONS

Hinckley, Ken, et al. "The props-based interface for neurosurgical visualization." Studies in health technology and informatics (1997): 552-564.*

"Sketchup_Tutorial": a publicly accessible video titled "Quick building model, in Google Sketchup, using textures", published Oct. 16, 2011, viewable at: https://www.youtube.com/watch?v=m-HKpOyv_U4; select screenshots included.*

"Sketchup_Tutorial_2": a publicly accessible video titled "Texture mapping in Sketchup" published Feb. 16, 2011, publicly viewable at: https://www.youtube.com/watch?v=XRQLS8P7xsY; select screenshots included.*

NPL Video: "Vasari Essential Skills—Work planes"; Posted by: Autodesk Building Solutions. Published on Nov. 10, 2010, https://www.youtube.com/watch?v=4V6TjWODEgw; select screenshots included.*

Vasari Video, Titled "Vasari Step One—Site—Solar Study", Published Nov. 1, 2011; https://www.youtube.com/watch?v=ZjDFhOCd1D0; select screenshots included. (Year: 2011).*

International Search Report and Written Opinion dated Mar. 9, 2015, in PCT Application No. PCT/US2014/062308 filed Oct. 27, 2014.

Jeffrey, Dennis, "Creative Design With Autodesk Inventor 2009 Courseware", Using Work Features in Autodesk Inventor 2008, Version 2.1, AICE, Jun. 30, 2008, 15 pages.

Cheke, Donald B., "TurboCAD Pro V19.1—Workplanes", Demystifying TurboCAD Workplanes, Oct. 2012, 12 Pages.

Celentano, et al., "Observing and Adapting User Behavior in Navigational 3D Interfaces", In Proceedings of the Working Conference on Advanced Visual Interfaces, May 25, 2004, 8 pages.

Yotam, et al., "2D-Centric Interfaces and Algorithms for 3D Modeling", A Dissertation Submitted in Partial Fulfillment of the Requirements for the Degree of Doctor of Philosophy, Department of Computer Science, New York University, May 2009, 141 pages.

Takayuki, et al., "Virtual Interaction Surface: Decoupling of Interaction and View Dimensions for Flexible Indirect 3D Interaction", In IEEE Symposium on 3D User Interfaces, Mar. 4, 2012, 4 pages.

Response to Written Opinion filed Jun. 9, 2015, in PCT Application No. PCT/US2014/062308.

"Second Written Opinion Issued in PCT Patent Application No. PCT/US2014/062308", Dated: Oct. 16, 2015, 10 Pages.

"International Preliminary Report on Patentability Issued in PCT Application No. PCT/US2014/062308", Dated: Jan. 26, 2016, 11 Pages.

Response to Communication dated Jul. 18, 2016 in European Patent Application No. 147969521.1, 10 Pages.

"First Office Action and Search Report Issued in Chinese Patent Application No. 201480059656.9", Dated: Feb. 8, 2018, 15 Pages.

"Office Action Issued in Chinese Patent Application No. 201480059656.9", dated Oct. 9, 2018, 17 Pages.

"Office Action Issued in European Patent Application No. 14796952.1", dated Jun. 6, 2019, 7 Pages.

* cited by examiner

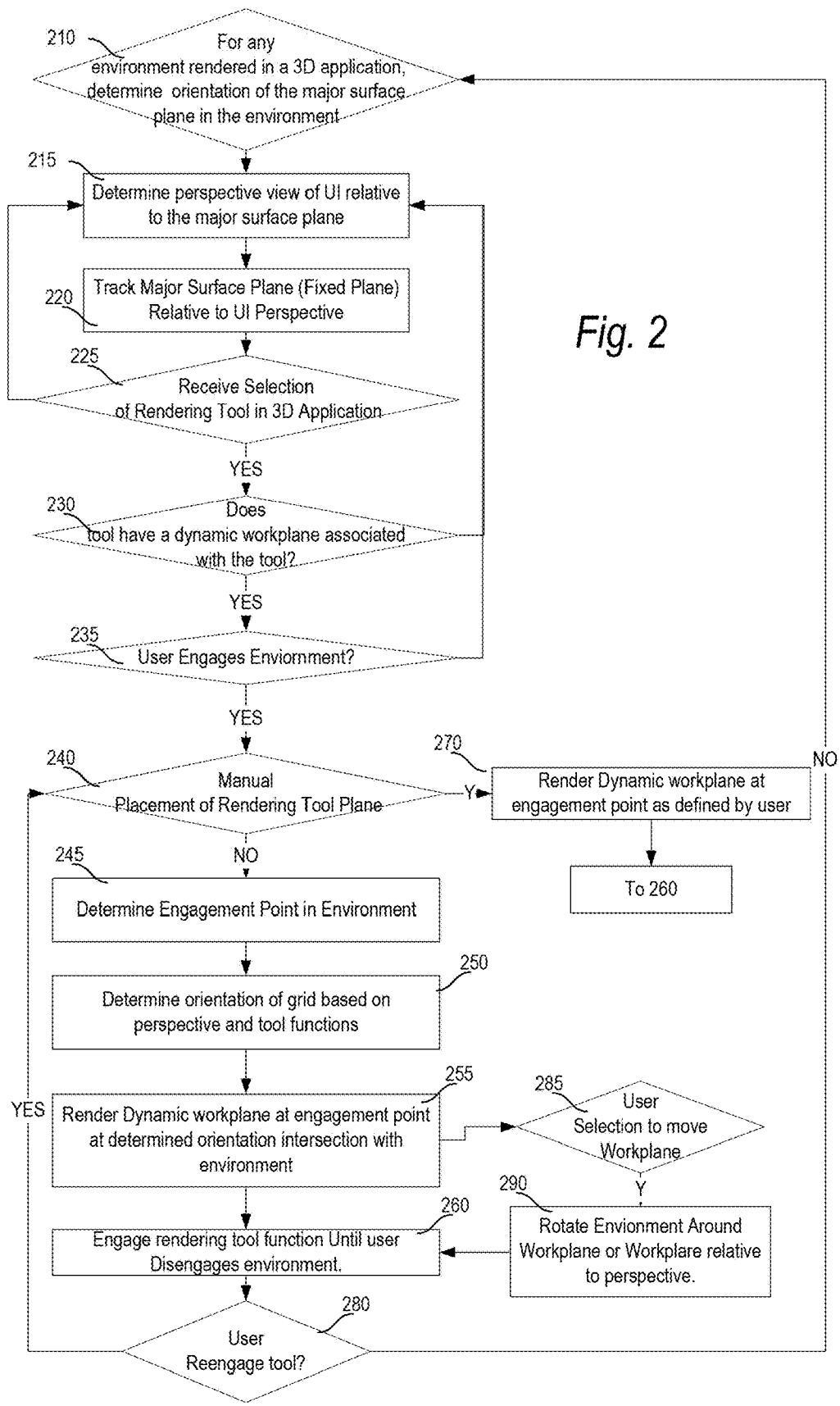

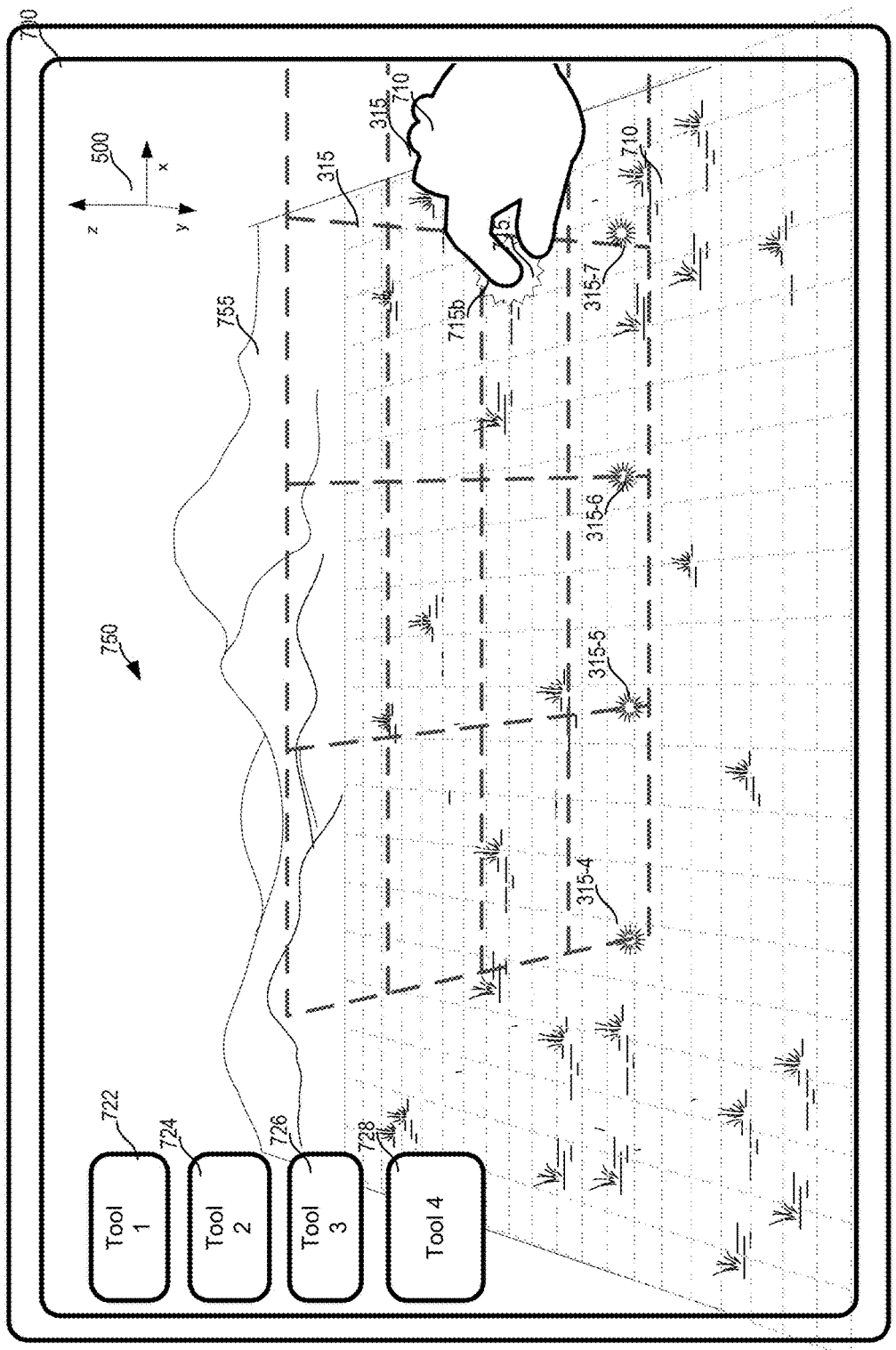

US 10,445,946 B2

DYNAMIC WORKPLANE 3D RENDERING ENVIRONMENT

BACKGROUND

A number of computer implemented applications allow users to render three-dimensional (3D) environments. Generally such applications may use one or more static guides in the form of planes within the 3D environment as references to allow the user to determine object placement within the environment.

Touch and mouse interfaces are inherently two-dimensional, and it is often not intuitive at what depth the user wants to perform an action in a 3D environment. Numerous different type of actions may be supported with the 3D environment, including sculpting and object placement tasks.

SUMMARY

Technology is presented which provides a dynamic workplane in a 3D rendering environment accessed through a two dimensional user interface. The dynamic workplane is associated with a rendering tool in a rendering application for the 3D environment. A reference plane is determined in the 3D environment. The reference plane may be an in-memory plane for an initial rendering or defined based on an existing structure in the 3D environment. A user interacts with the environment through a user input device and a two-dimensional user interface which has a view perspective of the environment. When a rendering tool is selected and the environment engaged by a user to use the tool, a dynamic workplane is rendered relative to the reference workplane. The dynamic workplane orientation and position are dependent on the view perspective, the rendering tool selected and an interaction location in the 3D environment.

In one aspect, a computer implemented method for rendering a three dimensional environment includes techniques for rendering a dynamic workplane. At least one reference plane and a view perspective relative to the reference plane are determined. A user then selects a rendering tool via a user input device the workplane is rendered in the three dimensional environment. The workplane orientation and position being dependent on the view perspective, the rendering tool selected and an interaction location in the environment.

BRIEF DESCRIPTION OF THE DRAWINGS

FIG. 2 is a flowchart illustrating one embodiment of the technology presented herein.

FIG. 5B depicts a touchscreen interface with a three-dimensional environment and a dynamic workplane shown at the first orientation and a second position.

DETAILED DESCRIPTION

Technology is presented which provides a dynamic workplane in a 3D rendering environment accessed through a two dimensional user interface. The dynamic workplane is associated to a rendering tool in a rendering application for the 3D environment. A reference plane is determined in the 3D environment. The reference plane may be an in-memory plane for an initial rendering or defined based on an existing structure in the 3D environment. A user interacts with the environment through a user input device and a two-dimensional user interface which has a view perspective of the environment. When a rendering tool is selected and the environment engaged by a user to use the tool, a dynamic workplane is rendered relative to the reference workplane. The dynamic workplane orientation and position are dependent on the view perspective, the rendering tool selected and an interaction location in the 3D environment. The location and orientation of the dynamic workplane can be dynamic and change with each interaction by the user, each tool selected, and with changes in perspective relative to the 3D environment. The dynamic workplane can be locked, or manually placed by a user.

Figure 1A:
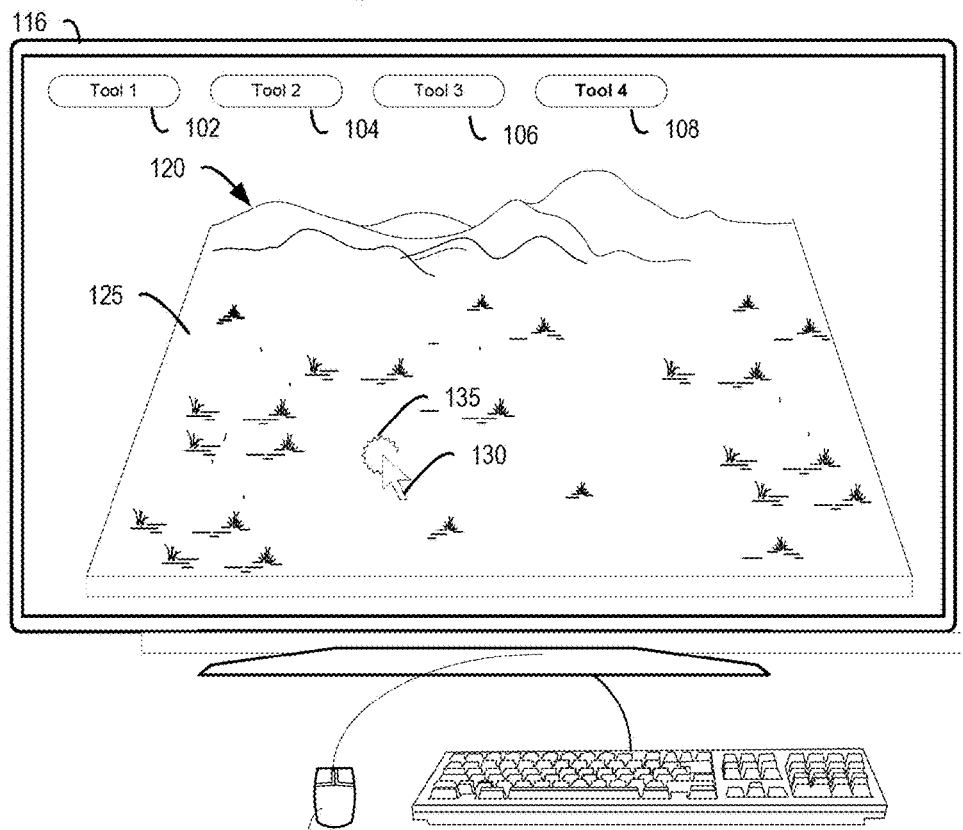
FIG. 1A depicts a first type of user interface using a mouse and keyboard.
Figure 1B:
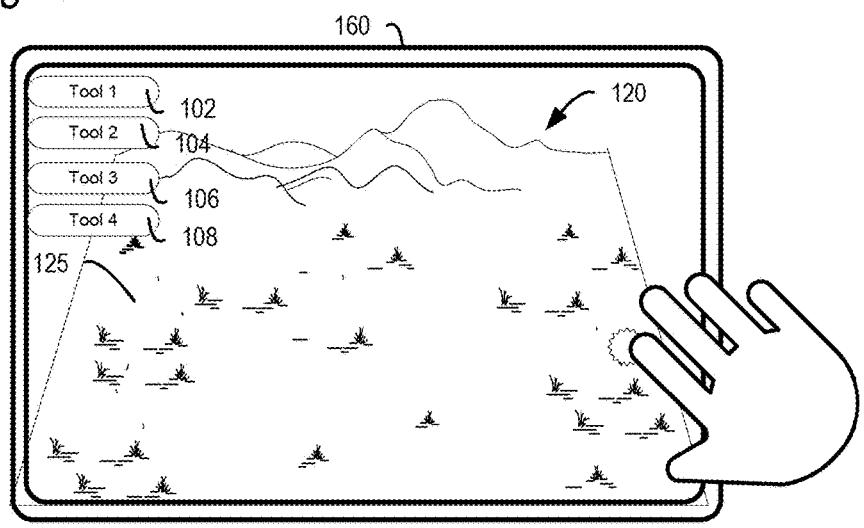
FIG. 1B depicts a second type of interface using a touch screen.

FIGS. 1A and 1B illustrate user interfaces and user input devices for a computing system implanting a 3D rendering application. In this context, a 3D rendering application may comprise a computer implemented application allowing the creation, modification and display of an environment illustrated in three-dimensions. FIG. 1A illustrates a display 116 which may be a stand-alone monitor coupled to a computing device or have an integrated computing system. Input devices comprising a keyboard 150 and mouse 162 may be used to interact with the application and the display 116. As is well known in the art, such devices can be used to manipulate a cursor 130 to select interaction points 135 in the 3D environment 120. The interaction point is the position on a two-dimensional display that results in a determination of an interaction location in the 3D environment.

Figure 11:
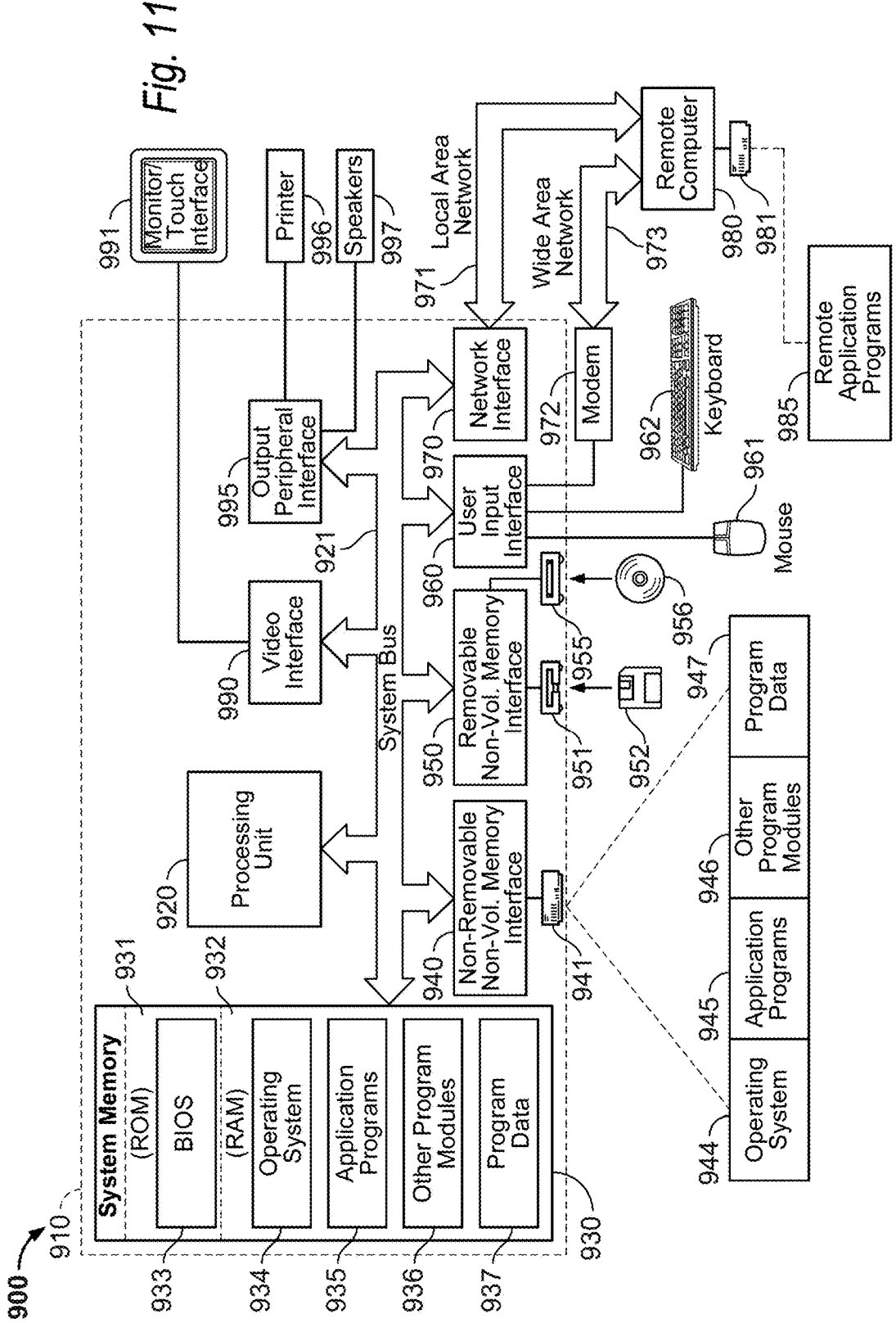
FIG. 11 illustrates a first type of computing device suitable for performing the present technology.
Figure 12:
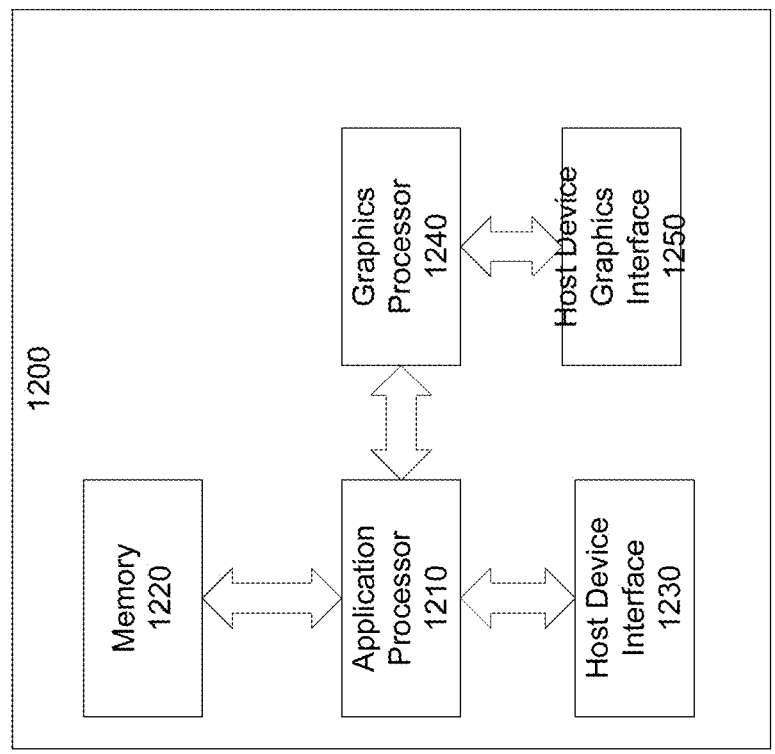
FIG. 12 illustrates a second type of computing device suitable for performing the present technology.

FIG. 1B illustrates a touch-sensitive display 160, which may be a stand-alone display coupled to a computing device or have an integrated computing system. Exemplary computing systems which may be connected to or incorporated with display 116/160 are illustrated in FIGS. 11 and 12. FIG. 1B illustrates a human hand 175 interacting with environment 120 using the touch interface of FIG. 1B. Such interaction with a touch-screen user input device is enabled by the technology presented herein. It should be understood that the user input devices are not limited to those illustrated in FIGS. 1A-1B, but may include other types of input devices such as, for example, gesture detection devices using RGB and/or depth sensors. One example of such an interface device is the Kinect available from Microsoft Corporation, Redmond, Wash.

As illustrated in FIGS. 1A and 1B, each display 116/160 may have rendered therein a three-dimensional environment 120. The environment 120 includes a surface 125 which is generally planar, with multiple features provided on the surface 125. Tools in the 3D rendering application can be used to add land, features, and other elements to the environment, as well as remove and modify elements in the environment. It should be understood that the three-dimensional environment 120 can take any number of different shapes and forms, and the three-dimensional environments illustrated herein are merely exemplary and provided to illustrate the technology discussed herein.

Figure 1C:
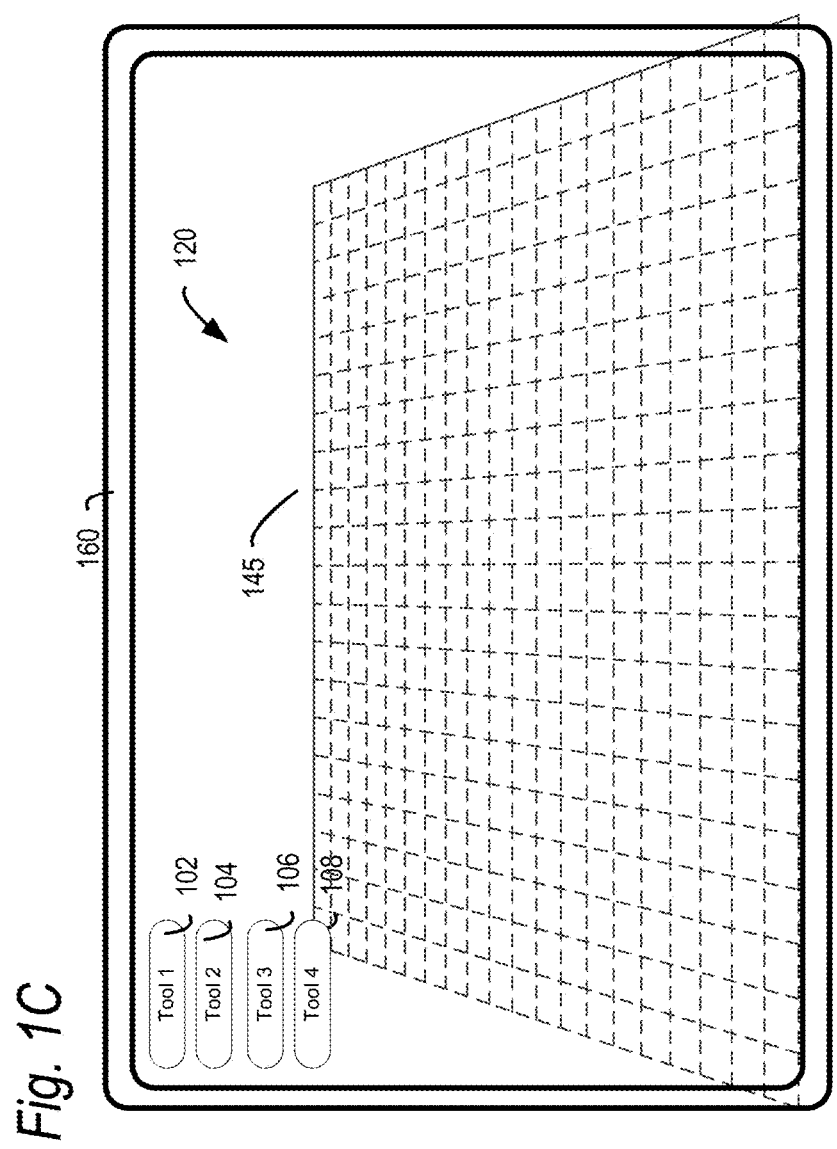
FIG. 1C depicts the second type of interface with an empty 3D environment.

In addition, a plurality of tool selector icons 102, 104, 106, 108 are illustrated in FIGS. 1A-1C. Each selector enables a different rendering tool in the 3D rendering application generating 3D environment 120 allowing one to add, delete or modify the environment 120.

FIG. 1C illustrates the display 160 of FIG. 1B with no #D 3 environment elements therein, but showing a representation of an in-memory reference plane 145. The reference plane 145 may be used by the technology herein as a reference for any 3D environment created in accordance with the technology. As illustrated in FIGS. 1A-1C, the reference workplane 145 has an orientation and area generally corresponding to surface 125, however the reference workplane need not correspond to any particular structural elements in the 3D environment 120.

Figure 5A:
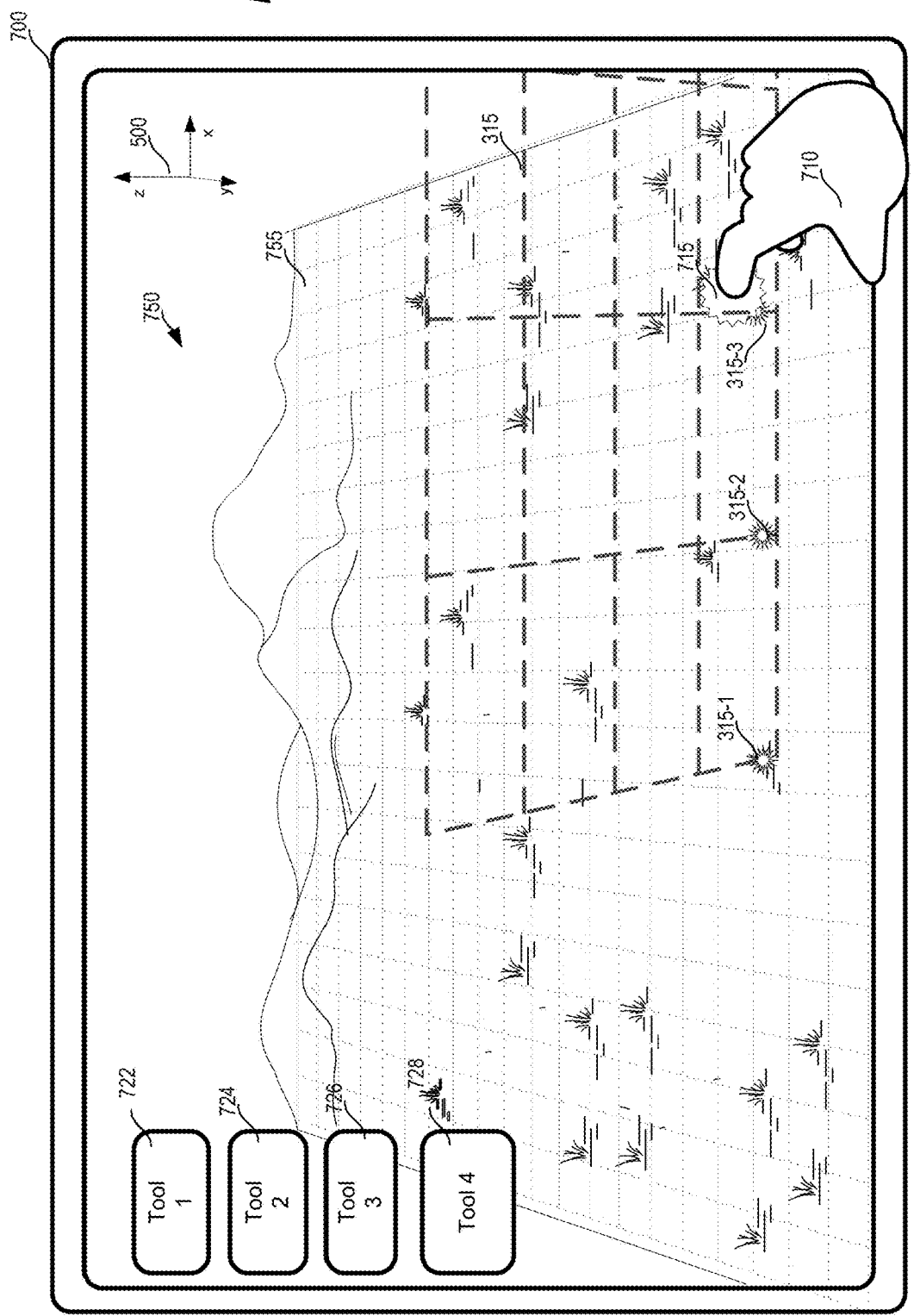
FIG. 5A depicts a touchscreen interface with a three-dimensional environment and a dynamic workplane shown at a first orientation and position.

The technology presented here in provides the user with an on-screen visual workplane which is dependent upon the tool selected in the 3D rendering application, as well as the perspective of the user interface relative to the 3D environment. As illustrated in FIG. 5A, when a user's hand 710 engages the screen in a touch-screen interface at an interaction point 715, a workplane 315 is displayed in a location, orientation, and position within the 3D environment which is based on the interaction point 715, the perspective view of the 3D environment, and the tool the user has selected.

Figure 3A:
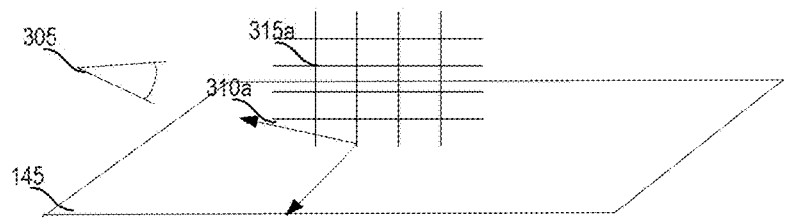
FIGS. 3A through 3F illustrate various perspectives and positioning of dynamic workplanes in accordance with the present technology.

FIG. 2 is a flow chart illustrating the technology rendering a dynamic workplane in a 3D environment. At step 210, for any environment rendered in a 3D rendering application, a determination is made as the orientation of the reference plane in the environment. FIGS. 3A-3F illustrate the reference plane 145 presented with respect to FIG. 1C and the orientation of dynamic workplanes relative to the user interface perspective of the reference plane 145. The reference plane, as discussed above, can be utilized to determine the location and orientation for rendering a dynamic workplane. At step 215, a determination of the perspective view of a user interface relative to the reference plane is made. A number of different perspective views are illustrated in FIGS. 3A-3F. In FIG. 3A, for example, the user perspective is represented by a position of camera 305, and viewing angle 310 relative to plane 145. In this configuration, for example, a dynamic workplane 315 is presented in a head-on view with the major surface of the plane facing camera 305 with the plane perpendicular to the reference plane 145.

As noted herein, the presentation in FIG. 3A is exemplary and depends not only on the perspective of the user interface camera 305, but the tool selected.

At step 220, the orientation of the reference plane 145 relative to the user interface perspective is continuously tracked. In this manner, the technology maintains knowledge of the orientation of the reference plane 145 relative to a view perspective of the user interface. As the perspective of the reference plane 145 changes, a workplane may change with the perspective or remain fixed, based on user interaction with the dynamic workplane (to, for example, lock the dynamic workplane) or the function of the tool.

At step 225, a selection of a rendering tool in the 3D application is made. A number of rendering tool selection buttons 102-108 are shown in FIGS. 1A-1C. The tools are illustrated generically with the understanding that the tools may comprise any of a number of different types of rendering tools. Tools can add elements, remove elements, alter elements, or perform any of a number of different types of rendering functions within a 3D rendering application. For purposes of this description, the term rendering elements within the 3D environment includes adding, deleting, and editing any type of three-dimensional element within a three-dimensional rendering application.

Once a tool is selected at step 225, at step 230 a determination is made as to whether or not the tool has a dynamic workplane associated with it. Not all rendering tools will require use of a dynamic workplane, but some tools are advantageously provided with dynamic workplane functions. As noted herein, the positioning and orientation of the dynamic workplane may be dependent upon the function provided by the rendering tool. If the tool does not have a dynamic workplane, the method returns to step 215. If the tool does have a dynamic workplane, user engagement with the environment is determined at step 235. User engagement can include moving a cursor using the user input devices discussed above with respect to FIG. 1A, touching the surface of a display 160 as discussed with respect to FIG. 1B, or any other manner of engaging functionality of the 3D rendering application using an input device.

Once user engages the environment at step 235, a determination is made at 240 as to whether or not user wishes to manually place the rendering tool plane. Manual placement of the rendering tool plane overrides the use of a dynamic workplane. User wishes to manually define placement of the rendering tool plane, then at step 270, the "dynamic" workplane will be rendered at the engagement point defined by the user and the method will proceed to step 262 engage the rendering tool.

If no manual placement of the rendering plane occurs at 240, then at 245, a determination is made as the engagement point of the dynamic workplane with the environment. The engagement point is the location of the cursor or touch interface point as discussed above with respect to FIGS. 1A and 1B) or any other point of engagement between user interface and the three-dimensional environment. As noted below, in one aspect, the engagement point is relative to the user's placement of their interface device on the two dimensional interface screen relative to the three-dimensional environment. The engagement point can be used to determine placement and the intersection between the dynamic workplane and the reference plane 145. As will be generally understood with reference to FIGS. 1A-1C, the engagement point is represented on a two dimensional screen (such as displays 116/160) but represents a location in three dimensions within the 3D environment. As such, the two dimensional representation of the engagement point is translated to the 3D environment to determine the location within the environment where the engagement point lies.

Figure 4:
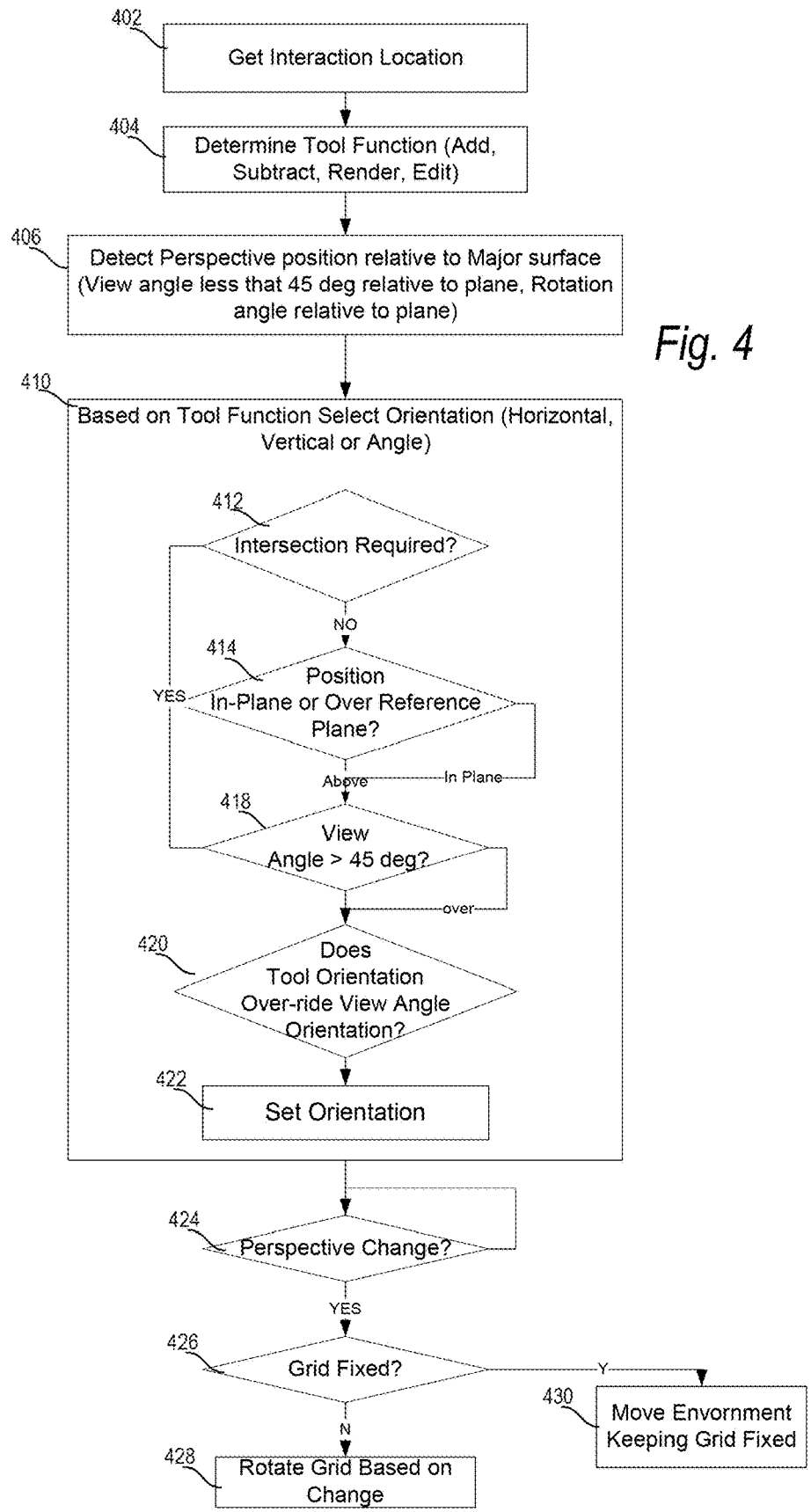
FIG. 4 is a flowchart illustrating a second aspect of the present technology.

Once the engagement point is determined at 245, a determination of the orientation of the grid based on the perspective of the user interface and the tool functions is made at 250. FIG. 4 provides additional detail on determining the orientation at 250. At step 255, the dynamic workplane is rendered at the engagement point and at the determined orientation in the 3D environment. Any intersection with the reference plane or other elements in the 3D environment may be highlighted in the environment.

After rendering the dynamic workplane, the tool associated with the rendering function can be utilized at 260. In accordance with the technology, the rendering tool functions are constrained to the dynamic workplane for tools utilizing the dynamic workplane, in the context of the function of the tool. Coincident with rendering the dynamic workplane at 255, a user may select to move or lock the dynamic workplane in place at 285. If the user selects to lock the workplane at 285, any change in perspective of the user interface relative to the dynamic workplane will cause the dynamic workplane to appear fixed such that the dynamic workplane is rotated with elements in the 3D environment at 290. The workplane is rendered until user disengages the tool. When user reengages the tool 280, process returns to step 240.

FIGS. 3A-3F illustrate various dynamic workplane orientations relative to user perspective of the reference plane 145. It should be understood that the orientations shown in the figures generally represent how the view perspective relative to a reference plane affects the orientation of the dynamic workplane. Rendering tool functions can alter the positioning of the dynamic workplane 315 for identical perspectives.

In FIG. 3A, the reference plane 145 is viewed at a view angle 310a relative to the user perspective camera 305. In this instance, the dynamic workplane 315a is rendered perpendicular to the surface of reference plane 145 and intersects reference plane 145 at a generally 90° angle, with the surface plane aligned normal to the viewing angle 310a and camera 305. FIG. 3A illustrates a perspective similar to that shown in FIGS. 5A and 5B for a rendering tool.

As noted above, the tool selected for use with the rendering application may affect the orientation and position of the dynamic workplane. In the case illustrated in FIG. 3A, for example, the rendering tool may be an add tool—for example a tool to add structures such as land to a 3D environment. For such tool, the dynamic workplane is selected to have the orientation illustrated in FIG. 3A. Other orientations may be selected based on the tool function and in accordance with the design of the 3D rendering application.

Figure 3B:
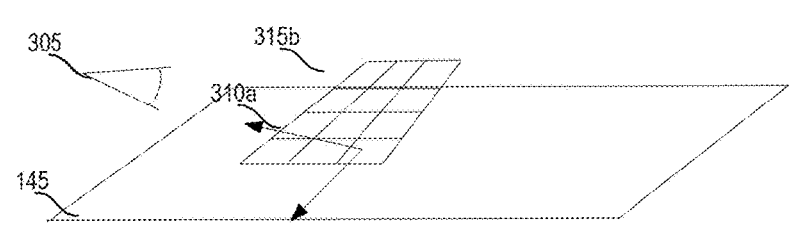

FIG. 3B illustrates, for the same perspective shown in FIG. 3A, how tool selection may change the dynamic workplane. In FIG. 3B, for the same perspective and same viewing angle 310a, the dynamic workplane is shown as being parallel to the reference plane 145. This position and orientation of the dynamic workplane 315b may be altered from the position and orientation shown in FIG. 3A where, for example, the tool in FIG. 3B is a tool removing features such as a tunnel or erasing tool. In this example, the use of, for example, an erasing tool can result in a change the orientation and position of the dynamic workplace 315b. In the example of an erasing tool, an intersection with existing structures may be desirous for proper operation of the tool, or the tool's function may be more properly aligned with the use of particular orientations (parallel over perpendicular to the reference plane, in this example,) than other orientations.

Figure 3C:
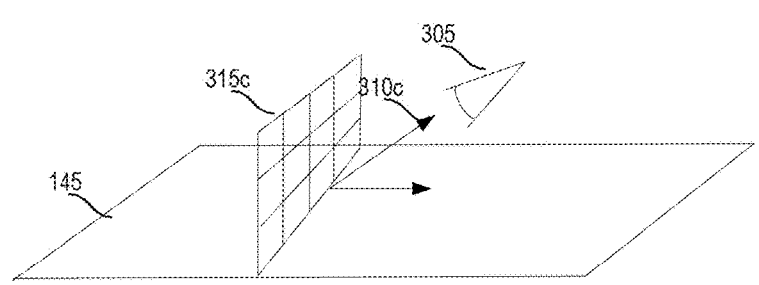

FIG. 3C illustrates a perspective which is rotated approximately 90° with respect to the perspective shown in FIG. 3A. As a result, workplane 315c is rotated 90° with respect to the workplane 315a shown in FIG. 3A.

Figure 3D:
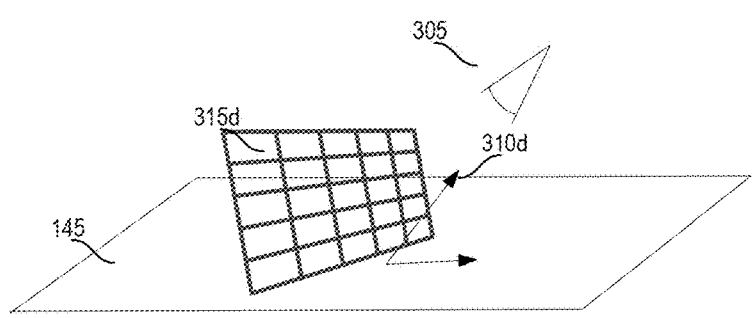

FIG. 3D illustrates an increased viewing angle 310d relative to the viewing angle 310c shown in FIG. 3C, where the function of tool dictates that the dynamic workplane 315D exist and angle relative to reference plane 145, but normal to the viewing perspective of camera 305. Viewing angle 310d is shown as greater than 45 degrees relative to reference plane 145.

Figure 3E:
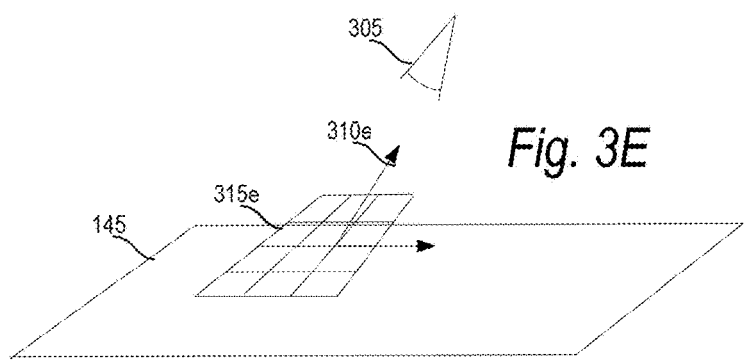

FIG. 3E illustrates another example of a viewing angle greater than 45° relative to reference plane 145, causing the dynamic workplane 315e be positioned parallel to the surface of reference plane 145.

Figure 3F:
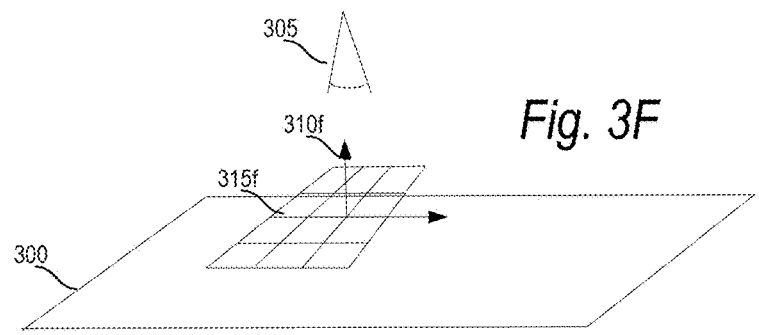
Figure 8:
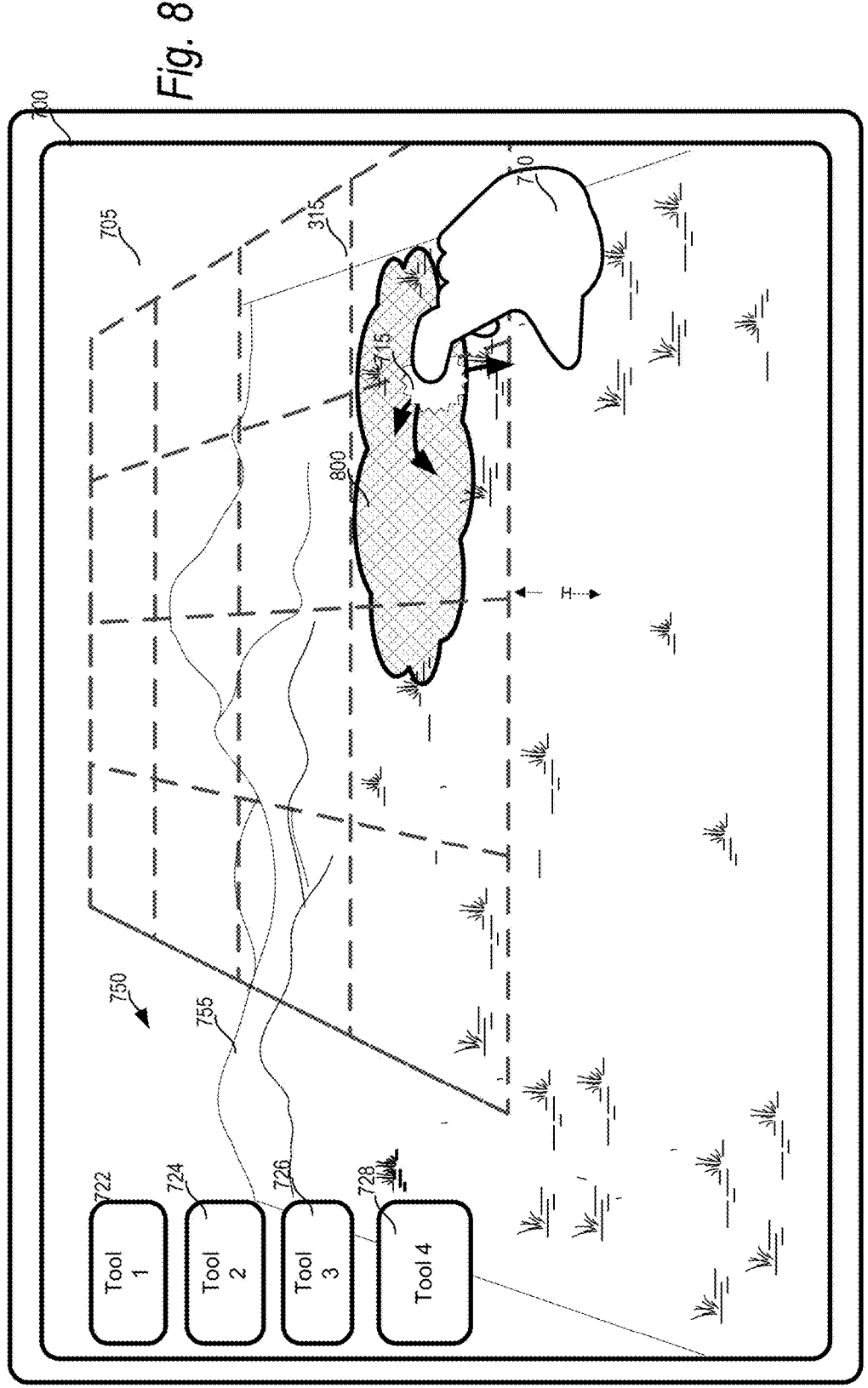
FIG. 8 depicts a touchscreen interface with a three-dimensional environment and a dynamic workplane shown at a second orientation and a third position.

Similarly FIG. 3F illustrates the viewing angle 310f which is approximately 90° with respect to plane 145. The camera 305 presents a user viewing with a "top-down" view of the reference plane 145, an example of which is illustrated in FIG. 8. Again, the dynamic workplane 315f will be positioned parallel to the reference plane 145 of the reference plane. It should be understood that the location over the surface of reference plane 145 is dependent on the interaction point such that the dynamic workplane 315 may engage the surface (as may be advantageous with respect to a deletion tool) or be positioned above the reference plane 145, (as may be necessary when using a construction tool).

FIG. 4 illustrates a method in accordance with the technology for performing step 255 in FIG. 2. At step 402, the interaction locations received via in input device is determined. As noted above, the interaction location will comprise a location in the three dimensional coordinate system of the 3D environment which is derived from the interaction location on the two dimensional projection of the 3D environment to a display. At step 404, the tool function is determined. As noted above, the tool function will, in conjunction with the view perspective, affect the position and orientation of the rendering of the dynamic workplane. At 406, the view perspective position relative to the reference is determined. This includes determining the view angle of greater than or less than 45° relative plane and rotation angle relative to the interaction location point in 3D environment.

At step 410, based on the tool function, and orientation (horizontal, vertical, or orientation angle) is selected. In order to determine the orientation, at 412 a determination is made as to whether the function of the tool would benefit from an intersection of the dynamic workplane with existing structures in the 3D environment. At 414, again based on the tool function, a determination is made as to whether the dynamic workplane may be positioned in plane or over the plane. At 418, a determination is made as to whether the view angle is greater or less that 45 degrees.

If the view angle is greater than 45 degrees, as illustrated in FIGS. 3E and 3F, at 420, a determination is made as to whether the tool orientation of the dynamic workplane should override any preference based on the view perspective. As noted herein, certain tools may make better use of different orientations of a dynamic workplane. For example, if a "create land" tool has a "plateau" option, a preference in the tool for a horizontal plane may exist.

At 422, using the input from steps 412, 414, 418 and 420, the orientation is set, and the workplane may be rendered at the input location on a display in accordance with the method of FIG. 2.

Steps 424-430 determine whether, for a change in perspective, the orientation of the dynamic workplane will change. At step 424, for a change in perspective, at 436 a determination is made as to whether or not the dynamic workplane is fixed in a particular location within the 3D environment. As noted above, a user can lock the grid in place when using the tool, or choose to have the grid move and recalculate for each interaction with a given tool, in accordance with FIG. 2. At step 428, the grid is not fixed, then the grid will rotate for any change in use perspective. At 420, if the workplane is fixed, the environment will rotate around the workplane keeping the workplane in the fixed location previously determined at 410.

FIGS. 5A and 5B illustrate positioning the dynamic workplane 315. The user interface 700 illustrated in FIGS. 5A and 5B comprises a touchscreen interface such that the hand 710 of a user engages the screen interface 700 at interaction point 715. An XYZ coordinate reference 500 is also illustrated in FIGS. 5A-10 to illustrate the rotational state of the 3D environment.

As illustrated in FIG. 5A, user interface 700 includes a number of tool selectors 722, 724, 726 and 728. When a hand 710 engages the screen at interaction point 715, the dynamic workplane 315 is rendered perpendicular to and intersecting the surface 750. The rendering of the workplane illustrates intersection points 315-1, 315-2, 315-3 where the plane intersects with any structure, in this case land surface 755, in the 3D environment. It should be recognized that no grid for the reference plane 145 need be presented, but the location and orientation of the reference plan relative to the environment is maintained. The reference plane may mimic surface 755 illustrated in FIG. 5A. Surface 755 is a piece of terrain, and the dynamic workplane 315 engages the terrain as illustrated by the intersection points 315-1-315-3. Other illustrations of intersection, or no illustrations of intersection, may be used.

FIG. 5B illustrates the effect of moving the interaction point 715. As illustrated in FIG. 5B, when a user engages interface 700 at a different interaction point, e.g., 715b, the position of the dynamic workplane moves with respect to this interaction point and the intersection points 315-4 through 315-7 show the intersection of the dynamic workplane with the surface 755.

Figure 6:
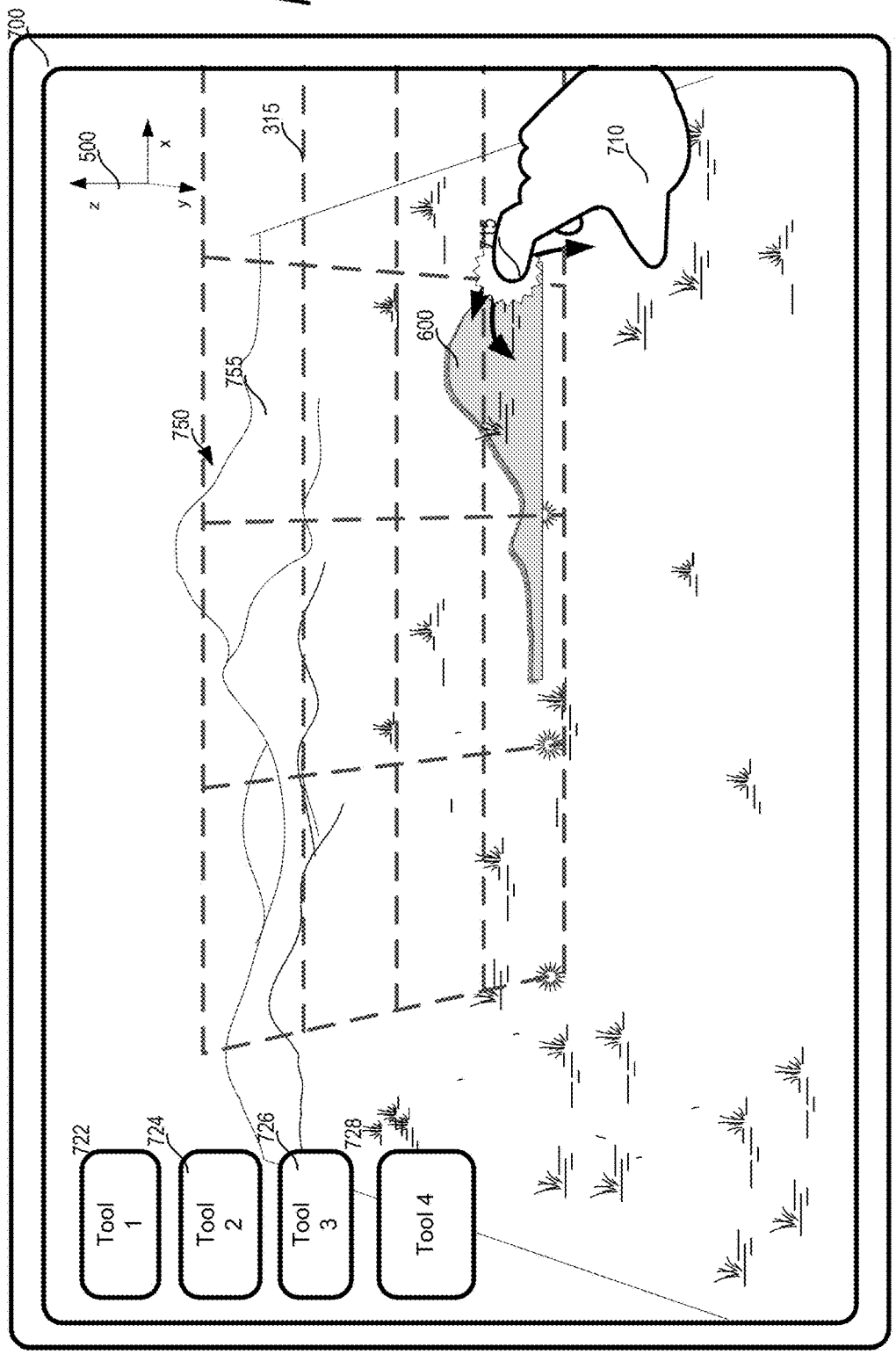
FIG. 6 depicts a touchscreen interface with a three-dimensional environment and a dynamic workplane shown at the first orientation and at the second position with a rendering tool creating an element on the plane in the environment.

FIG. 6 illustrates the use of a rendering tool being manipulated by the user interface 700 in conjunction with the dynamic workplane 315 shown in FIG. 5B. In this instance, when a user selects a particular rendering tool, rendering structure 600 is created as the user moves back and forth relative to the interaction point 715. The constructed structure 600 is constrained to the dynamic workplane 315 of the user knows exactly where in the three-dimensional environment 750 the rendered element will appear.

Figure 7:
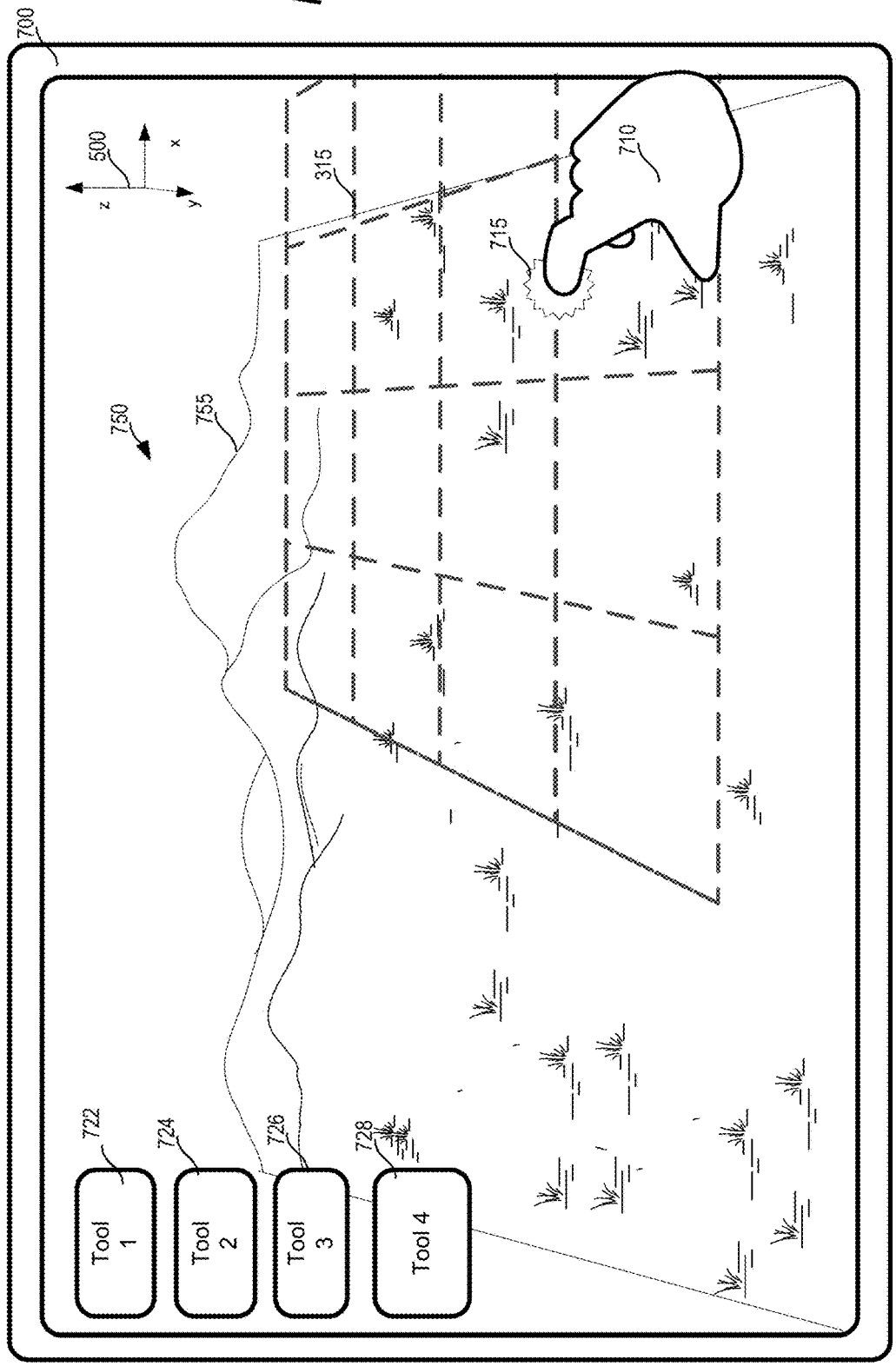
FIG. 7 depicts a touchscreen interface with a three-dimensional environment and a dynamic workplane shown at a second orientation and a third position.

FIG. 7 illustrates another placement of the dynamic workplane which in this example is generally parallel to surface 755. The orientation and position of the workplane illustrated in FIG. 7 is similar to that shown in FIG. 3B, above. This instance, the workplane 315 engages surface at a position over the surface depending on the type of tool used, even though the orientation of the interface 700 is generally the same as shown in FIGS. 5-6.

FIG. 8 illustrates the use of a rendering tool to create a structure 800 in the parallel workplane 315 positioned at a height H above surface 755. It should be understood that the height indicator is not shown in the interface 700. The orientation and position of the workplanes in FIG. 8 is similar to the representation of the work and shown in FIG. 3B, above.

Figure 9:
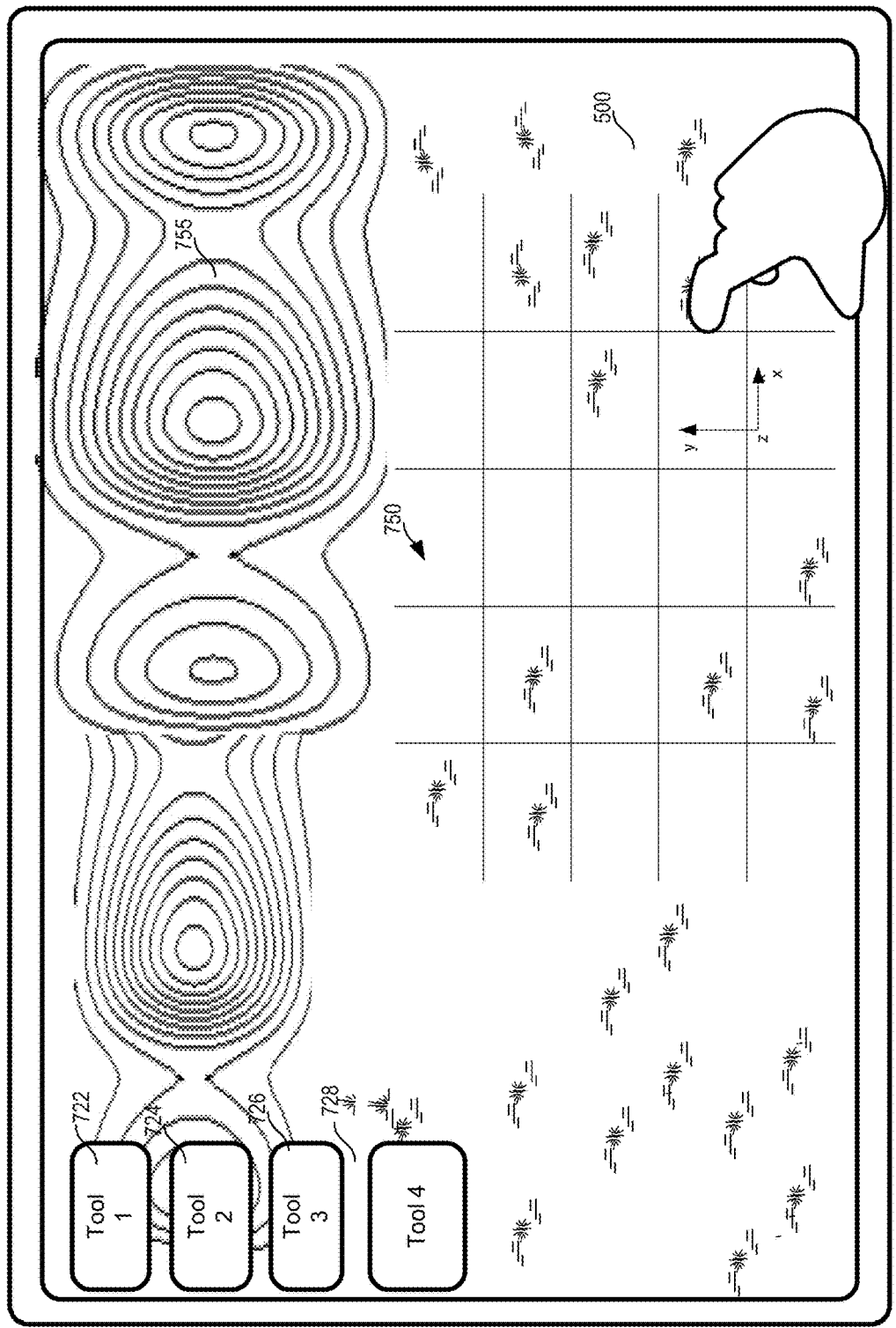
FIG. 9 depicts a touchscreen interface with a three-dimensional environment and a dynamic workplane shown at a third orientation rotated with respect to the orientation in FIG. 5 and a fourth position.

FIG. 9 illustrates a top-down view of the workplane 315 illustrated in FIG. 7. Again, the workplane is parallel to reference workplane and surface 755.

Figure 10:
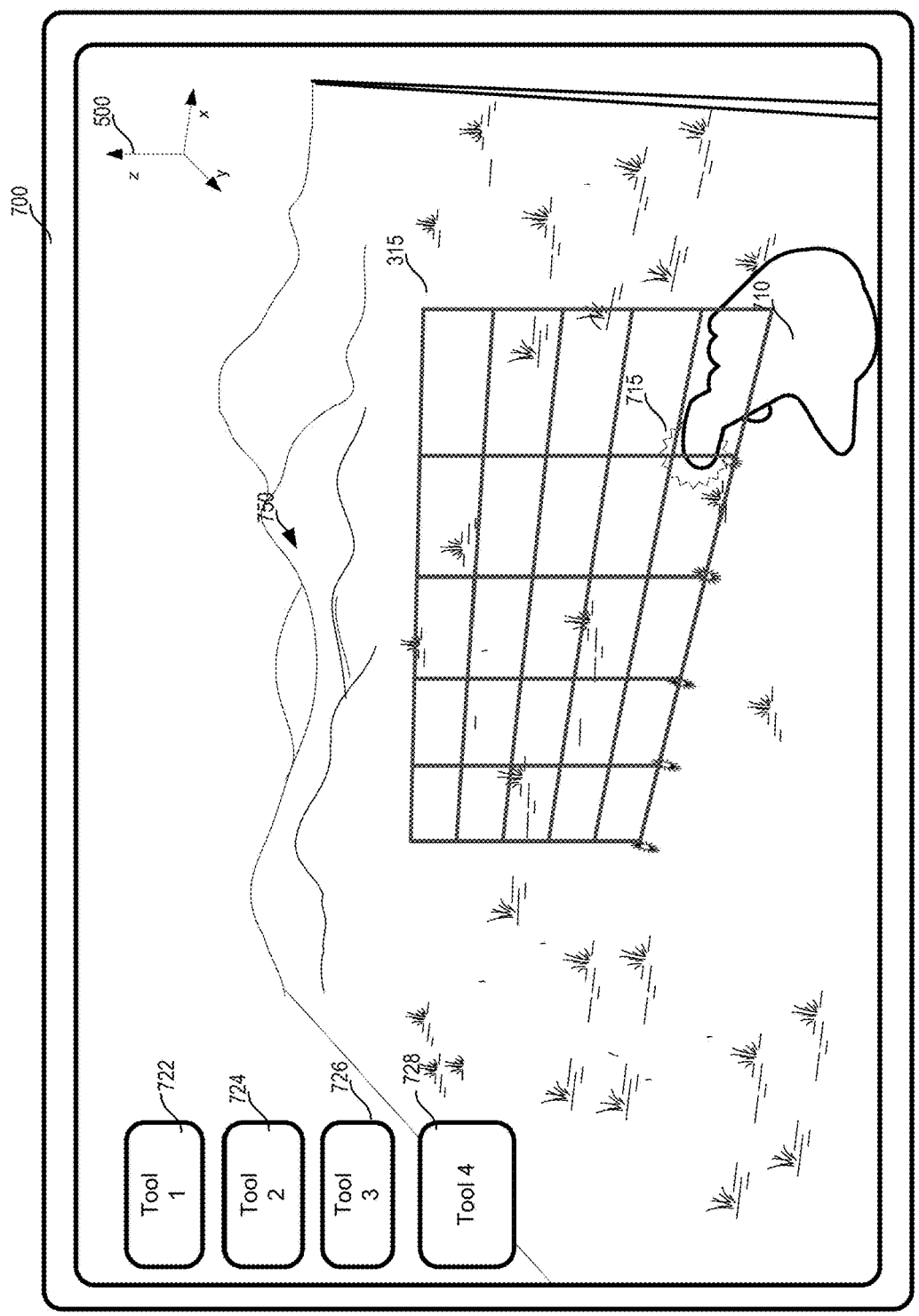
FIG. 10 depicts a touchscreen interface with a three-dimensional environment and a dynamic workplane shown at the second orientation parallel to a surface of the environment with a rendering tool creating an element in on the plane in the environment.

FIG. 10 illustrates a workplane that is not oriented at an angle relative to the view perspective of the interface 700, but rotated with the rotation (relative to FIGS. 5-9) of the 3D environment. Note that the change in orientation of is illustrated by rotation the XYZ reference 500. In the example shown in FIG. 10, the workplane 315 rotates with respect to the rotation of the reference plane 145 in the virtual environment. As such, the perspective of the user interface relative to workplane 315 is at an angle. This is the case when, for example, the workplane is fixed with respect to the rotation of the virtual environment.

FIG. 11 illustrates an example of a suitable computing system environment 900 such as personal computer on which the technology may be implemented. The computing system environment 900 is only one example of a suitable computing environment and is not intended to suggest any limitation as to the scope of use or functionality of the technology. Neither should the computing environment 900 be interpreted as having any dependency or requirement relating to any one or combination of components illustrated in the exemplary operating environment 900.

The technology is operational with numerous other general purpose or special purpose computing system environments or configurations. Examples of well known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The technology may be described in the general context of computer-executable instructions, such as program modules, being executed by a computer. Generally, program modules include routines, programs, objects, components, data structures, etc. that perform particular tasks or implement particular abstract data types. The technology may also be practiced in distributed computing environments where tasks are performed by remote processing devices that are linked through a communications network. In a distributed computing environment, program modules may be located in both local and remote computer storage media including memory storage devices.

FIG. 11 illustrates an exemplary computing system suitable for use with the present technology.

With reference to FIG. 11, an exemplary system for implementing the technology includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. Computer readable media includes both volatile and nonvolatile, removable and non-removable media implemented in any method or technology for storage of information such as computer readable instructions, data structures, program modules or other data. Computer media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 11 illustrates operating system 934, application programs 935, other program modules 936, and program data 939.

The computer 910 may also include other tangible removable/non-removable, volatile/nonvolatile computer storage media. By way of example only, FIG. 11 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through an non-removable memory interface such as interface 944, and magnetic disk drive 951 and optical disk drive 955 are typically connected to the system bus 921 by a removable memory interface, such as interface 950.

The drives and their associated computer storage media discussed above and illustrated in FIG. 11, provide storage of computer readable instructions, data structures, program modules and other data for the computer 910. In FIG. 11, for example, hard disk drive 941 is illustrated as storing operating system 944, application programs 945, other program modules 946, and program data 947. Note that these components can either be the same as or different from operating system 934, application programs 935, other program modules 936, and program data 939. One example of an application program 935 is the 3D rendering application discussed herein. Operating system 944, application programs 945, other program modules 946, and program data 949 are given different numbers here to illustrate that, at a minimum, they are different copies. A user may enter commands and information into the computer 20 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video adapter 990. Monitor 991 may be a touch interface monitor, such as that described above with respect to FIG. 1B. In addition to the monitor, computers may also include other peripheral output devices such as speakers 997 and printer 996, which may be connected through a output peripheral adapter 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 11. The logical connections depicted in FIG. 11 includes a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 11 illustrates remote application programs 985 as residing on memory device 981. It will be appreciated that the network connections shown are exemplary and other means of establishing a communications link between the computers may be used.

One example of an application program 935 is the 3D rendering application discussed herein. The technology provided herein may be integrated into an application program or provided in a hardware device such as a system on chip or application specific microprocessor.

FIG. 12 is a block diagram of an exemplary application specific hardware device which may operate in embodiments of the technology. Device 1200 may be utilized in a host device or coupled directly to a user input device through a host device interface 1240 The device 1200 illustrated therein may include an application specific processor 1230 performing the steps illustrated in accordance with the description of the methods herein. The application specific processor 1230 may be coupled to a memory 1220 which may comprise any of the types of memory discussed herein allowing the processor to perform the method steps discussed herein and storing code and other information allowing for operation of the processor 1210. A graphics processor 1240 may output rendering instructions via a host device graphics interface 1250 to a host device. Alternatively the graphics interface and host device interface may be directly coupled to a display and user input devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method for rendering a three dimensional environment, comprising:
   determining a single reference plane defining a rendered surface within the environment;
   rendering the single reference plane at a fixed orientation and a fixed location in the three dimensional environment;
   receiving a selection of one of a first rendering tool and a second rendering tool via a user input device;
   in response to detecting user interaction at an interaction point within the three dimensional environment, and while rendering the single reference plane at the fixed orientation and the fixed location, rendering a workplane in a position in the three dimensional environment, the workplane defining a single plane in the three dimensional environment at which graphics are added, removed or modified, the addition, removal or modification of graphics being constrained by the workplane; and
   updating the position in which the workplane is rendered as the interaction point changes;
   wherein, in response to receiving a selection of the first rendering tool and without receiving a selection of a structure to be added, removed, or modified by the first rendering tool, the workplane is rendered at a first orientation relative to the reference plane,
   wherein, in response to receiving a selection of the second rendering tool and without receiving a selection of a structure to be added, removed, or modified by the second rendering tool, the workplane is rendered at a second orientation relative to the reference plane, and
   wherein the first orientation and the second orientation are recalculated as the interaction point changes.

2. The computer implemented method of claim 1 wherein the first rendering tool renders an element in the three dimensional environment, the element constrained within the workplane.

3. The computer implemented method of claim 1 wherein the workplane is rendered in response to a user engaging a preview of the workplane via the user input device.

4. The computer implemented method of claim 1 wherein the first and second orientations of the workplane may comprise any of:
   perpendicular to the reference plane, parallel to the reference plane, angled parallel to a plane formed by a display.

5. The computer implemented method of claim 1 wherein the first and second orientations of the workplane are locked with changes in perspective.

6. The computer implemented method of claim 1 wherein the first and second orientations of the workplane make a horizontal or vertical angle with the reference plane based on a perspective angle.

7. The computer implemented method of claim 1 wherein a user input at a location on a top portion of the display is interpreted at a greater depth in the three dimensional environment.

8. The computer implemented method of claim 1 wherein the fixed orientation of the reference plane does not correspond to a land surface in the three dimensional environment.

9. In a computer system having a graphical user interface including a display and a user interface selection device, a method of providing a rendering interface on the display, comprising the steps of:
   displaying at least one surface within a three dimensional environment on a display;
   determining a view perspective of the surface based on an orientation of the surface in the display;
   displaying a selection of a first rendering tool and a second rendering tool on the display;
   receiving a selection of one of the first and second rendering tools via a user input device;
   determining a user interaction location with the three dimensional environment via the user input device; and
   generating a rendering of a workplane in the environment, the workplane defining a plane in the three dimensional environment within which a structure may be added, removed or modified,
   wherein, in response to receiving a selection of the first rendering tool and without receiving a selection of a structure to be added, removed, or modified by the first rendering tool, the workplane is rendered at a first orientation relative to a single reference plane, the single reference plane being rendered at a fixed orientation and a fixed location while rendering the workplane,
   wherein, in response to receiving a selection of the second rendering tool and without receiving a selection of a structure to be added, removed, or modified by the second rendering tool, the workplane is rendered at a second orientation relative to the reference plane, and
   wherein the first orientation and the second orientation are recalculated as the user interaction location changes.

10. The method of claim 9 wherein the user interaction location is determined when a user engages a function of one of the first and second rendering tools.

11. The method of claim 9 further comprising:
    determining an additional user interaction location with the three dimensional environment and a re-rendering of the workplane in the environment, the workplane being re-rendered at a third orientation and a position based on a changed view perspective and the additional user interaction location.

12. The method of claim 9 wherein the rendering of the workplane is generated when a user engages the first rendering tool to render an element in the environment.

13. The method of claim 12 wherein the element is constrained within the workplane.

14. A method of rendering a three dimensional environment on a display device, comprising:
    rendering a single reference plane at a fixed orientation and a fixed location, the single reference plane defining a rendered surface within the three dimensional environment;
    determining a view perspective of the single reference plane;
    receiving a selection of one of a first rendering tool and a second rendering tool via a user input device;
    rendering a plurality of workplanes in the environment over time, a workplane of the plurality of workplanes having an orientation and a position being dependent on the view perspective and the rendering tool selected, the workplane being rendered in response to detecting user interaction at an interaction point within the three dimensional environment, and while rendering the single reference plane at the fixed orientation and the fixed location;

receiving a selection to use a function of the first rendering tool via the user input device, and in response to receiving the selection to use the function of the first rendering tool and without receiving a selection of a structure to be added, removed, or modified by the first rendering tool, constraining the function of the first rendering tool to the workplane in the three dimensional environment, and rendering the workplane at a first orientation relative to the single reference plane; and receiving a selection to use a function of the second rendering tool via the user input device, and in response to receiving the selection to use the function of the second rendering tool and without receiving a selection of a structure to be added, removed, or modified by the second rendering tool, constraining the function of the second rendering tool to the workplane in the three dimensional environment, and rendering the workplane at a second orientation relative to the single reference plane, wherein rendering the workplane includes highlighting intersections between the workplane and objects in the three dimensional environment, including an intersection between the workplane and an object having a z coordinate greater than a z coordinate of the single reference plane, and wherein the first and second orientations and a position of the workplane are recalculated for each interaction with the three dimensional environment by the user input device.

15. The method of claim 14 wherein the first and second orientations of the workplane may comprise any of:
perpendicular to the single reference plane, parallel to the single reference plane, and angled parallel to a plane formed by a display.

16. The method of claim 14 wherein the workplane is rendered before use of the function of the first rendering tool and use of the function of the second rendering tool.

17. The method of claim 14 wherein the first and second orientations of the workplane make a horizontal or a vertical angle with the single reference plane based on a perspective pitch angle.

18. The computer implemented method of claim 14 wherein the user input device manipulates a cursor, and wherein the interaction point is set by the cursor, such that the position in which the workplane is rendered changes as the cursor moves.

* * * * *